(12) United States Patent
Ferlay

(10) Patent No.: US 10,125,668 B2
(45) Date of Patent: Nov. 13, 2018

(54) COVER FOR A HEAT EXCHANGER BUNDLE

(71) Applicant: Valeo Systemes Thermiques, Le Mesnil Saint Denis (FR)

(72) Inventor: Benjamin Ferlay, Cernay la Ville (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 552 days.

(21) Appl. No.: 14/395,229

(22) PCT Filed: Apr. 18, 2013

(86) PCT No.: PCT/EP2013/058122
§ 371 (c)(1),
(2) Date: Oct. 17, 2014

(87) PCT Pub. No.: WO2013/156577
PCT Pub. Date: Oct. 24, 2013

(65) Prior Publication Data
US 2015/0068501 A1     Mar. 12, 2015

(30) Foreign Application Priority Data

Apr. 19, 2012  (FR) ..................................... 12 53620

(51) Int. Cl.
*F28F 9/00*         (2006.01)
*F02B 29/04*        (2006.01)
(Continued)

(52) U.S. Cl.
CPC ........ *F02B 29/0475* (2013.01); *F28D 9/0056* (2013.01); *F28F 9/001* (2013.01);
(Continued)

(58) Field of Classification Search
CPC ............... F28F 2265/30; F28F 2280/06; F28F 2225/02; F28F 2225/00
(Continued)

(56) References Cited

U.S. PATENT DOCUMENTS 1,617,369 A * 2/1927 Blakely ................... B60P 3/077
                                                        188/32
3,310,925 A * 3/1967 Le Brun ................... E04D 3/30
                                                        52/537
(Continued)

FOREIGN PATENT DOCUMENTS

DE   10 2009 025 282 A1   12/2010
EP        1 296 108 A2     3/2003
(Continued)

OTHER PUBLICATIONS

International Search Report for Application No. PCT/EP2013/058122 dated Sep. 23, 2013, 7 pages.
(Continued)

*Primary Examiner* — Devon Russell
(74) *Attorney, Agent, or Firm* — Howard & Howard Attorneys PLLC

(57) ABSTRACT

A cover (25) is intended to be attached to a housing (2) of a heat exchanger (1). The cover (25) comprises a wall (26) that is intended to close off an orifice (5) for introducing a heat exchange core into the housing (2). The wall (26) is configured to allow the cover (25) to be attached removably to the housing (2) and has a raised edge (27). The cover (25) also comprises means (30) for mechanical reinforcement of the wall (26). The invention also relates to a heat exchange core (7) comprising the cover (25), to a heat exchanger (1) comprising the core (7), and to an air intake module for a motor vehicle combustion engine comprising the heat exchanger (1).

9 Claims, 4 Drawing Sheets

Figure 1:
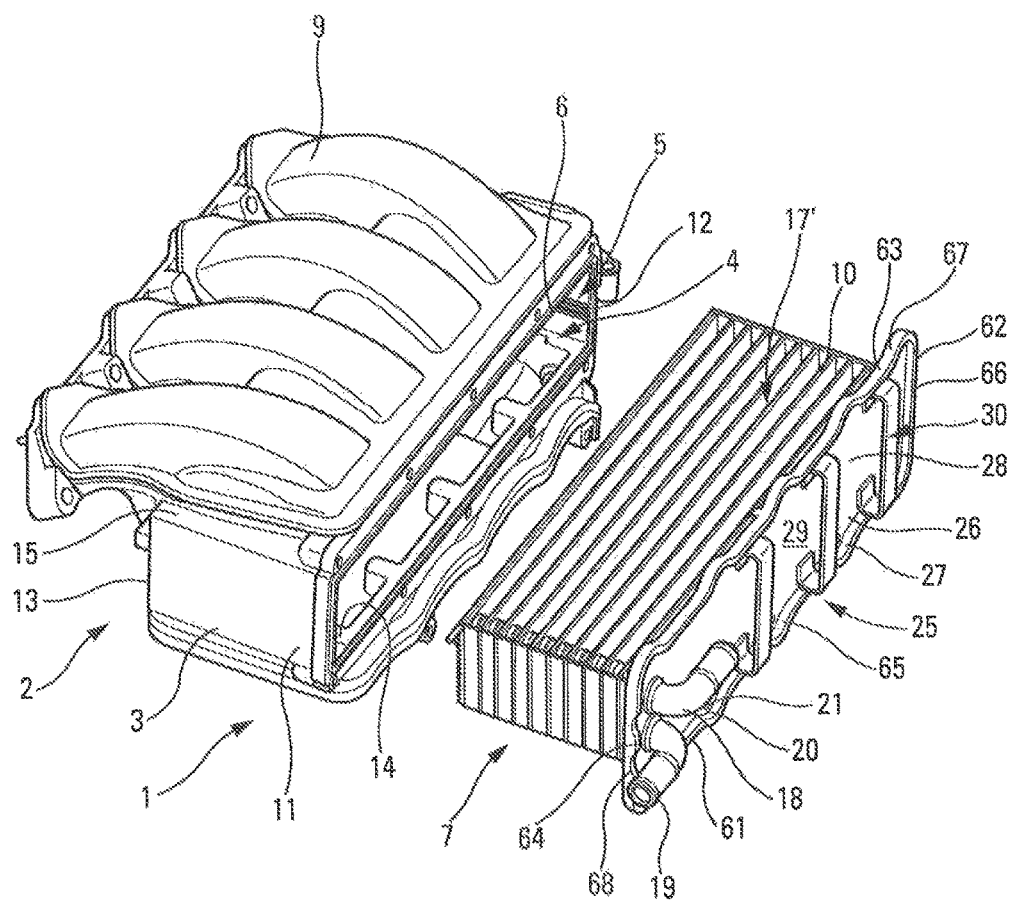

(51) Int. Cl.
  F28D 9/00 (2006.01)
  F28F 99/00 (2006.01)
  F28D 21/00 (2006.01)

(52) U.S. Cl.
  CPC .......... F28F 99/00 (2013.01); *F28D 21/0003* (2013.01); *F28D 2021/0082* (2013.01); *F28F 2225/08* (2013.01); *F28F 2265/02* (2013.01); *F28F 2280/02* (2013.01)

(58) Field of Classification Search
  USPC ................. 29/890.052; 52/522; 428/167
  See application file for complete search history.

(56) References Cited

U.S. PATENT DOCUMENTS

| | | | | |
|---|---|---|---|---|
| 3,688,803 | A * | 9/1972 | Pavia | F16L 9/003 138/173 |
| 3,834,544 | A * | 9/1974 | Tyson, Jr. | A61M 1/1698 210/321.75 |
| 3,848,323 | A * | 11/1974 | Perger | B21D 49/00 228/170 |
| 4,278,542 | A * | 7/1981 | Beulens | B01D 61/28 210/321.73 |
| 4,390,424 | A * | 6/1983 | Riede | B01D 61/28 210/232 |
| 5,184,439 | A * | 2/1993 | Ward | E04C 2/38 52/223.6 |
| 7,617,865 | B2 * | 11/2009 | Bazika | F02B 29/0462 165/153 |
| 2007/0283639 | A1* | 12/2007 | Kortuem | E04D 13/17 52/198 |
| 2008/0072613 | A1* | 3/2008 | Liu | F24F 1/0007 62/259.1 |
| 2008/0159848 | A1* | 7/2008 | Liu | F24F 1/0007 415/108 |
| 2011/0258923 | A1* | 10/2011 | Lais | A01G 13/0243 47/32.6 |
| 2014/0338873 | A1* | 11/2014 | Leroux | F02B 29/0462 165/172 |
| 2015/0184952 | A1* | 7/2015 | Ignjatovic | F02B 29/0425 165/158 |

FOREIGN PATENT DOCUMENTS

| | | | |
|---|---|---|---|
| EP | 1 830 048 A1 | 9/2007 | |
| FR | 2 614 980 A1 | 11/1988 | |
| FR | 2 742 533 A1 | 6/1997 | |
| FR | 2 803 907 A1 | 7/2001 | |
| FR | 2803907 A1 * | 7/2001 | .......... F28D 9/0043 |
| FR | 2 908 832 A1 | 5/2008 | |
| FR | 2 948 755 A1 | 2/2011 | |
| WO | WO 20071038871 A1 | 4/2007 | |

OTHER PUBLICATIONS

English language abstract and machine-assisted English translation for DE 10 2009 025 282 extracted from espacenet.com database on Oct. 30, 2014, 23 pages.

English language abstract and machine-assisted English translation for EP 1 296 108 extracted from espacenet.com database on Oct. 30, 2014, 24 pages.

English language abstract for EP 1 830 048 extracted from espacenet.com database on Oct. 30, 2014, 1 pages.

English language abstract and machine-assisted English translation for FR 2 614 980 extracted from espacenet.com database on Oct. 30, 2014, 7 pages.

English language abstract and machine-assisted English translation for FR 2 742 533 extracted from espacenet.com database on Oct. 30, 2014, 10 pages.

English language abstract and machine-assisted English translation for FR 2 803 907 extracted from espacenet.com database on Oct. 30, 2014, 36 pages.

English language abstract and machine-assisted English translation for FR 2 908 832 extracted from espacenet.com database on Oct. 30, 2014, 11 pages.

English language abstract and machine-assisted English translation for FR 2 948 755 extracted from espacenet.com database on Oct. 30, 2014, 25 pages.

* cited by examiner

COVER FOR A HEAT EXCHANGER BUNDLE

The invention relates to a cover for a heat exchanger core, a core comprising such a cover and a heat exchanger comprising such a core. It also comprises an air intake module for a combustion engine comprising such a heat exchanger.

The invention applies to all types of heat exchangers, in particular for motor vehicles, for example heat exchangers intended to be mounted in the engine compartment of the vehicle, such as charge air coolers (CACs) or engine exhaust gas recirculation coolers, also known as EGR exchangers (or EGRCs).

In this field, heat exchangers comprising a heat exchange core having a series of plates stacked parallel on top of one another are known. The core is placed in a housing that guides a fluid to be cooled through the core through which a cooling fluid flows. The stack of plates is secured to a heat exchanger cover which closes one of the faces of the housing in a removable manner, in particular by screwing.

One problem that is encountered arises from the fact that the housing and the cover may be subjected to mechanical stresses when the heat exchanger is in operation. These stresses may result in the deformation of the cover and impair the core.

These stresses originate on the one hand from the thermal expansion to which the housing is subjected when the fluid to be cooled passes through the core at high temperatures. On the other hand, the fluid to be cooled passes through the core at a pressure that can vary enormously and over a very short period of time, causing significant variations in the mechanical stresses that are exerted in the passage circuit thereof. These mechanical stresses risk bringing about swelling of the housing. Under some extreme operating conditions, expulsion of the cover or the appearance of a leak between the cover of the heat exchanger and the housing may even be observed.

A first solution that is used consists in soldering the cover to the housing. However, such a solution requires the use of a metal housing. Moreover, the cover is no longer removable.

The invention aims to improve the situation.

Thus, the invention relates to a cover intended to be attached to a housing of a heat exchanger, said cover comprising a wall that is intended to close off an orifice for introducing a heat exchange core into the housing, said wall being configured to allow the cover to be attached removably to the housing and having a raised edge, said cover also comprising means for mechanical reinforcement of said wall.

The term "removable" is understood to mean the fact of being able to be taken off without destroying the assembly, that is to say it is possible to take the cover off the housing without destroying either the cover or the housing, as would be the case with other types of securing, such as securing by soldering or by welding. An example of removable fastening is fastening by screwing or by riveting.

Thus, by virtue of the means for mechanical reinforcement of the wall, the invention makes it possible to improve the mechanical strength of the cover and thus to reduce the amplitude of the deformation of the cover when the latter is subjected to mechanical stresses.

According to one aspect of the invention, the mechanical reinforcement means are configured to project outwardly from the housing.

According to one exemplary embodiment of the invention, the mechanical reinforcement means comprise at least one mechanical strengthening rib. The ribs are located, for example, in a central part of the wall, that is to say in a different region from that which is taken up by the raised edge.

Advantageously, the rib or ribs are produced by stamping the wall.

According to a variant embodiment of the invention, all or some of the ribs, referred to as long ribs, extend in a mutually parallel manner along a length of said cover. The mechanical reinforcement means comprise, for example, two long ribs.

According to one aspect of the invention, at least one other of the ribs, referred to as a short rib, connects the long ribs together. The mechanical reinforcement means comprise, in particular, six short ribs.

According to one exemplary embodiment, the mechanical reinforcement means comprise at least one mechanical strengthening bar secured to all or part of a periphery of said cover.

According to one aspect of the invention, said cover has a substantially rectangular shape, a first of the bars is secured along a first long side of the cover and/or a second of the bars is secured along a second long side of the cover. Advantageously, a third of the bars is secured along a first short side of the cover and/or a fourth of the bars is secured along a second short side of the cover.

According to one exemplary embodiment, the bar or bars are soldered to the cover. Alternatively, the bar or bars are held on the cover by clinching. The bar or bars are secured to the cover, for example, at the same time as said cover is fastened to the housing.

According to one aspect of the invention, said reinforcement means comprise at least one mechanical reinforcement bracket secured to the wall. Advantageously, said cover has an approximately rectangular shape, said bracket being secured at a first and a second long side of the cover.

Advantageously, the bracket comprises at least one point for securing to the raised edge at the first long side of said raised edge, and a point for securing to the raised edge at the second long side of said raised edge.

According to one aspect of the invention, the bracket comprises at least one point for securing to a flat face of said wall. The flat face is located, in particular, in the central part of the wall.

According to one exemplary embodiment of the invention, the bracket comprises tabs secured to said wall at the raised edge and the flat face.

According to one aspect of the invention, the reinforcement means comprise a local section of increased height of the raised edge. Advantageously, said cover has an approximately rectangular shape, and, at the long sides of the rectangle, said raised edge is higher compared with the flat face in a middle region of the cover than in end regions of the cover. The section of increased height is, for example, in the form of an isosceles triangle, the apex between the two identical sides being the highest point of the section of increased height with respect to the flat face.

The invention also relates to a heat exchange core comprising a cover as defined above, said cover being secured to an end plate of said plates.

The invention also relates to a heat exchanger comprising a core as defined above and a housing accommodating said core, said cover being secured to said housing.

The invention furthermore relates to an air intake module for a motor vehicle combustion engine comprising a heat exchanger as defined above.

Figure 2:
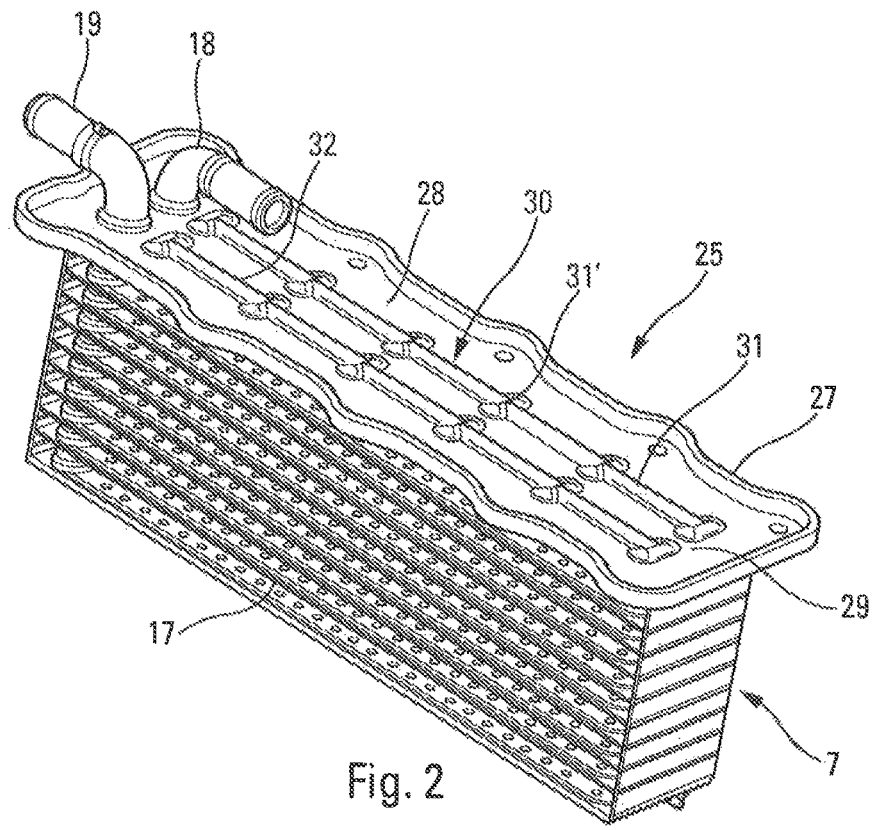
Figure 4:
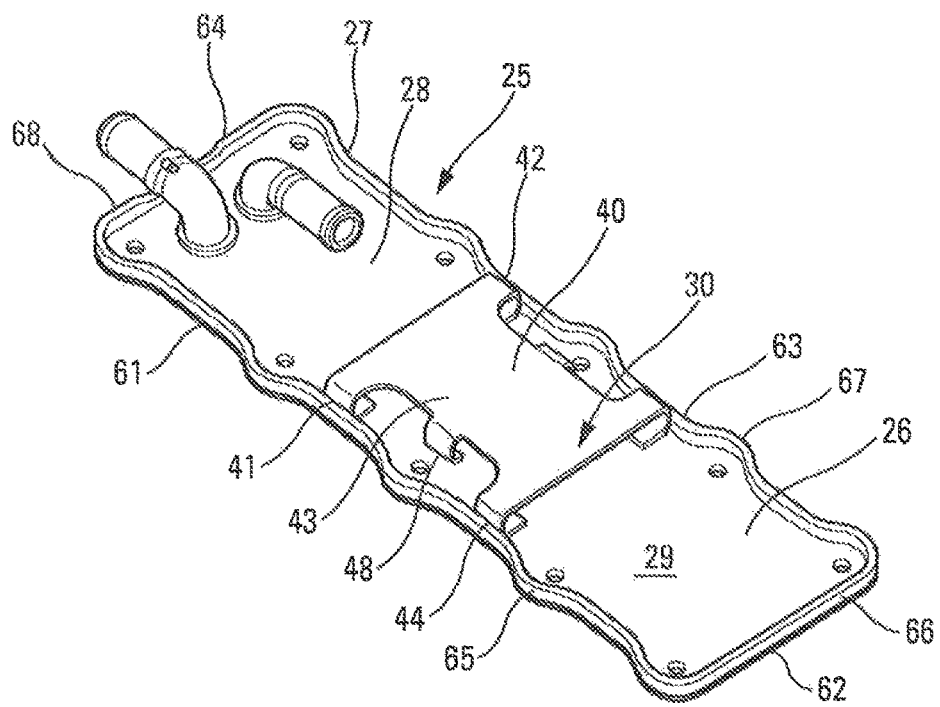
Figure 5:
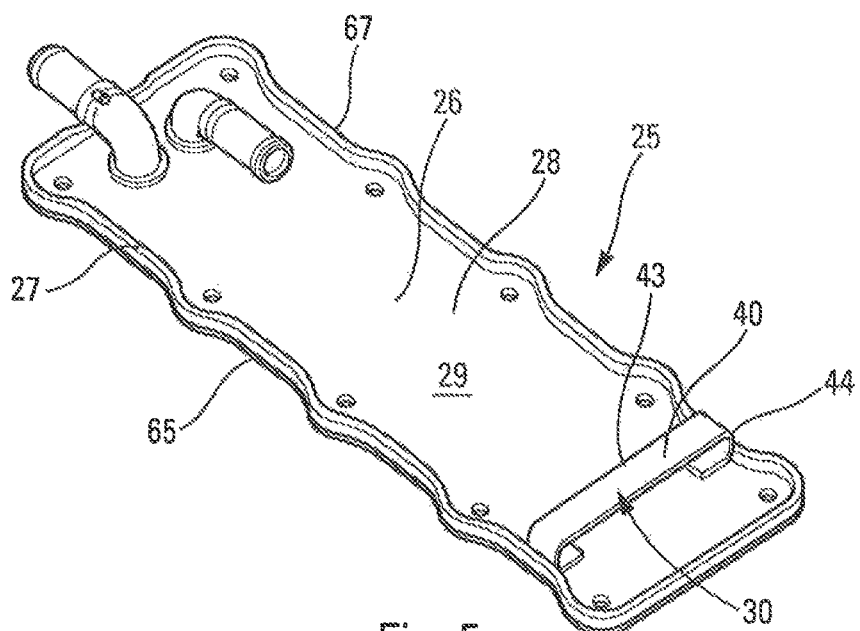
Figure 6:
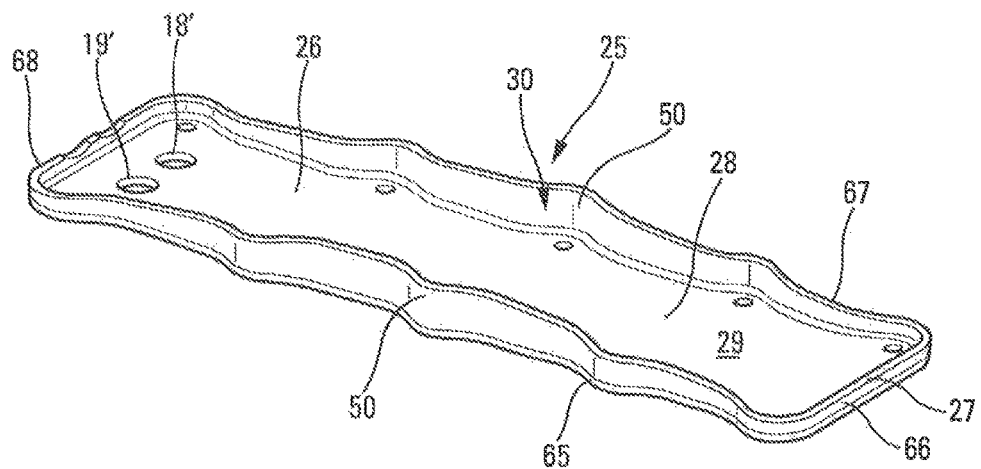
Figure 7:
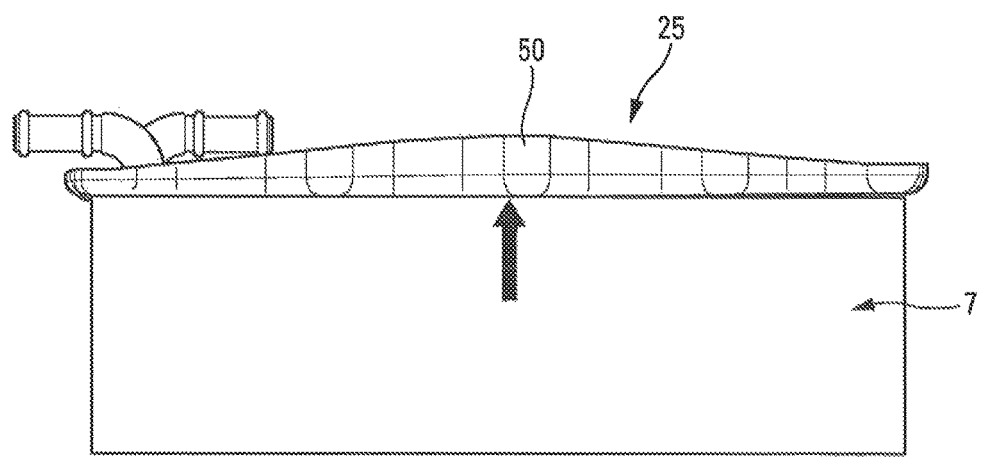

Further features, details and advantages of the invention will become more clearly apparent on reading the description given below by way of indication in relation to the drawings, in which:

FIG. 1 is an exploded perspective view of a heat exchanger according to the invention, FIG. 2 is a perspective view of a cover and of a core according to the invention, FIGS. 3 to 6 are perspective views of variant embodiments of the cover from FIG. 2 according to the invention, and FIG. 7 is a side view of the cover from FIG. 6 and of the core, illustrated schematically.

FIG. 1 illustrates an air intake module for a motor vehicle combustion engine, said module comprising a heat exchanger 1. Said air intake module has an outlet 9 for the intake air in the direction of the cylinder head of the engine. Said outlet 9 of the module divides the flow of intake air, in this case into four distinct flows.

Said heat exchanger 1 allows an exchange of heat between a first fluid, for example a cooling fluid, and a second fluid, in particular a fluid to be cooled. This heat exchanger is able to transfer the heat present in the fluid to be cooled to the cooling fluid. In this case, it is an air/water heat exchanger, that is to say that the fluid to be cooled is, for example, a flow of feed gas for the engine and the cooling fluid is, in particular, water to which glycol has been added.

The heat exchanger 1 comprises a housing 2 having a body 3 which has, for example, a hollow parallelepipedal overall shape. The hollow part of this body 3 forms an enclosure 4 that is accessible through an orifice 5 delimited by a rim 6. The housing 2 is obtained in this case by molding. It is made for example of thermoplastic material, thermoset material or of aluminum.

The heat exchanger 1 also comprises a core 7 that is intended to be installed in the housing 2, in particular in the enclosure 4. This core 7 is inserted by translational movement through the orifice 5. The core 7 in this case comprises a stack of plates 10 that determine between one another alternating circuits for the cooling fluid and for the fluid to be cooled. The plates 10 are arranged in pairs such that two plates 10 of a single pair determine a circulation duct for the cooling fluid between one another. The core 7 has in this case a parallelepipedal overall shape and has an inlet face (with the reference 17 in FIG. 2) and an opposite outlet face 17' for the fluid to be cooled. The circuits for the circulation of the fluid to be cooled are provided between two opposing plates 10 of two pairs of adjacent plates.

The body 3 has two lateral faces 11, 12, connected by a base 13, and two longitudinal faces 14, 15, known as the inlet face 14 and the outlet face 15, connecting the lateral faces. The longitudinal faces 14, 15 each comprise a frame that delimits an opening. The fluid to be cooled is thus intended to enter the heat exchanger 1 through the opening defined by the frame of the longitudinal inlet face 14 before passing through the core 7 and exiting the heat exchanger 1 through the opening delimited by the frame of the longitudinal outlet face 15. The fluid to be cooled then exits the intake module by way of its outlet 9, as seen above.

A cover 25 of the heat exchanger according to the invention is secured to the stack in the region of an upper plate of the stack. The cover 25 is intended to be secured to the housing 2. It comprises a wall 26 designed to close off the orifice 5 through which the core 7 is introduced into the housing 2. The wall 26 is configured to allow the cover 25 to be fastened removably to the housing 2. For this purpose, it comprises, in particular, means for securing to the housing 2, for example openings 21, in particular provided in the region of lugs 20. It is thus possible to screw or rivet the cover 25 to the housing 2 and to disconnect it from the housing 2 without destroying the cover 25 and/or the housing 2.

The core 7 and the cover 25 are made, in particular, of aluminum or aluminum alloy.

The cover 25 has in this case an approximately rectangular shape. It thus comprises a first and a second mutually opposite long side 61, 63 and a first and a second mutually opposite short side 62, 64. The first long sides 61, 63 of the cover 25 are located on the same side as the inlet face and the outlet face 17', respectively, of the core 7.

The wall 26 comprises a first face intended to be directed toward the interior of the housing 2, and a second face 29, opposite the first face and intended to be directed toward the outside of the housing 2. As explained below, the first and second faces 29 are substantially flat. They are located in a central part 28 of the wall 26.

The wall 26 also comprises a raised edge 27. The raised edge 27 is located along all or part of the periphery of the cover 25. In this case, the raised edge 27 extends along the entire periphery of the cover 25. The raised edge 27 extends transversely to the central part 28 of the wall 26, in particular perpendicularly, and closely follows the contour of said central part 28 of the wall 26, following, for example, the shapes defined by the lugs 20. In the example illustrated in FIG. 1, the raised edge 27 has a constant height, that is to say that a distal end of the raised edge 27 is more or less at the same distance from the central part 28 of the wall 26 all along the raised edge 27. Once the cover 25 has been fastened to the housing 2, the raised edge 27 is directed toward the outside of the housing 2, that is to say that it projects from the second face 29 of the central part 28 of the wall 26.

The raised edge 27 comprises a first and a second long side 65, 67, which are located at the first and second long sides 61, 63 of the cover 25, and a first and a second short side 66, 68, which are located at the first and the second short sides 62, 64 of the cover 25.

The heat exchanger 1 comprises inlet and/or outlet nozzles 18, 19, for the cooling fluid, which communicate with the openings (having the references 18', 19' in FIG. 6) provided in the cover 25 and allow the cooling fluid to enter and/or exit the core 7.

According to the invention, the cover 25 comprises means 30 for mechanical reinforcement of the wall 26. The mechanical reinforcement means 30 are configured in this case to project outwardly from the housing 2, that is to say that they project from the second face 29 of the central part 28 of the wall 26.

Figure 3:
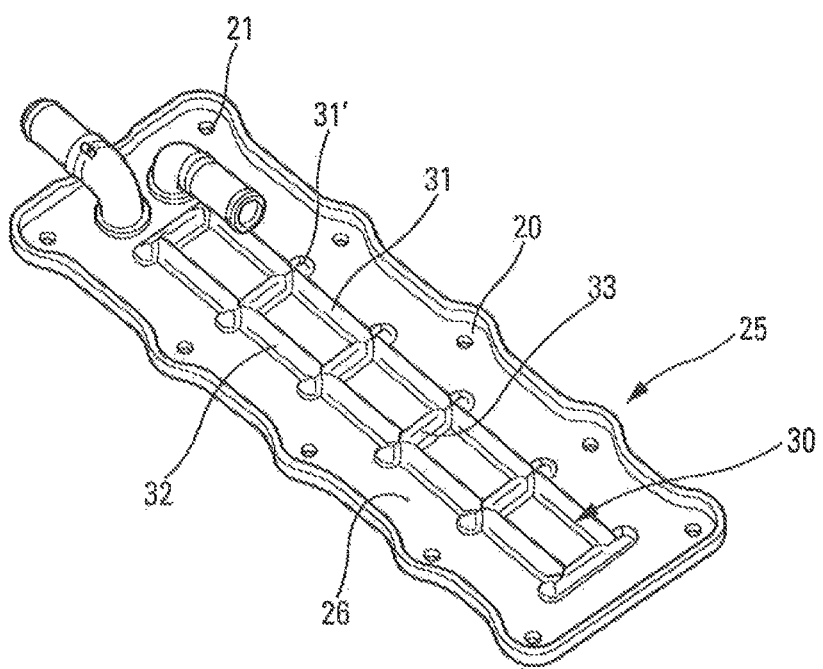

FIGS. 2 and 3 illustrate the embodiment of the cover 25 in which the mechanical reinforcement means 30 comprise at least one mechanical strengthening rib 31, 32, 33. The ribs 31, 32, 33 are located, for example, in the central part 28 of the wall 26, that is to say in a different region from the region taken up by the raised edge 27. The ribs 31, 32, 33 are produced, for example, by stamping the wall 26. They comprise, for example, bosses 31', which are present, in particular, at the longitudinal ends of the ribs and in particular between the longitudinal ends thereof. These bosses 31' extend transversely to the longitudinal extension of the ribs 31, 32, 33 and increase the mechanical reinforcement properties of the ribs 31, 32, 33.

The mechanical reinforcement means 30 in this case comprise long ribs 31, 32, in particular two long ribs 31, 32, which extend substantially parallel to one another along a length of the cover 25. On account of their longitudinal extensions, the long ribs in this case reinforce the wall 26 against bending deformation in different directions.

According to the exemplary embodiment illustrated in FIG. 3, at least one other of the ribs, known as a short rib 33, connects the long ribs 31, 32 together. The mechanical reinforcement means in this case comprise six short ribs 33. The short ribs 33 extend, in particular, perpendicularly between the long ribs 31, 32 and may project beyond the latter in the region of the bosses 31'.

FIG. 4 shows the embodiment of the cover 25 in which the mechanical reinforcement means 30 comprise at least one mechanical reinforcing bracket 40 secured to the wall 26. The bracket 40 is secured to the cover 25 at the first and the second long sides 61, 63 of the cover 25. The bracket 40 comprises, for example, at least one point 41 for securing to the first long side 65 of the raised edge 27, and a point 42 for securing to the second long side 67 of the raised edge 27. The bracket 40 comprises, in particular, at least one point 48 for securing to a flat face of the wall 26, in this case the second face 29.

The bracket 40 may comprise a central body 43 substantially with a rectangular shape, and tabs 44 secured to the wall 26 at the raised edge 27 and the second face 29. The central body 43 is substantially flat. The tabs 44 have a U-shaped cross section and originate from the central body 43. In the example illustrated in FIG. 4, the bracket 40 comprises six tabs 44. It comprises two tabs 44 secured to the first long side 65 of the raised edge 27 and to the second face 29 of the wall 26, two tabs 44 secured to the second long side 67 of the raised edge 27 and to the second face 29 of the wall 26, and two tabs 44 secured only to the second face 29 of the wall 26. The tabs 44 secured to the long sides 65, 67 of the raised edge 27 are secured thereto by way of the central part of the U. A first of the two lateral legs of the U of the tabs 44 is connected to the central body 43 and a second of the two lateral legs of the U of the tabs 44 is secured to the second face 29 of the wall 26.

FIG. 5 illustrates an exemplary embodiment in which the bracket 40 is simplified and comprises two mutually opposite tabs 44 with respect to the body 43. One of the two tabs 44 is secured to the first long side 65 of the raised edge 27 and the other of the two tabs 44 is secured to the second long side 67 of the raised edge 27. The central body 43 has, in particular, the same dimension as the tabs 44 along the longitudinal extension of the cover 25.

Although only one bracket 40 is shown in the two exemplary embodiments illustrated in FIGS. 4 and 5, it is of course possible to secure a number of brackets 40 to the same cover 25 in order to increase its mechanical strength. The invention also provides for the arrangement of one or more brackets 40 comprising six tabs 44 with one or more brackets 40 comprising two tabs 44.

FIGS. 6 and 7 illustrate the embodiment of the cover 25 in which the reinforcement means 30 comprise a local section of increased height 50 on the raised edge 27. The section of increased height 50 is in this case present on the first and second long sides 65, 67 of the raised edge 27. A section of increased height is understood to mean the fact that the raised edge 27 is higher compared with the second face 29 of the wall 26 at the section of increased height 50. This section of increased height 50 has its highest point, in particular, in a middle zone of the cover 25 and for example at the middle of the long sides 65, 67 of the raised edge 27. The section of increased height is highest in a central region of the cover 25 in order to reinforce this region, which is likely to be subject most to stresses, to the maximum.

The section of increased height is, for example, identical on the first and on the second long side 65, 67 of the raised edge 27. The short sides 66, 68 do not have a section of increased height in this case. The section of increased height 50 is, in particular, in the form of an isosceles triangle, the apex between the two identical sides of the triangle being the highest point of the section of increased height 50 with respect to the second face 29 of the wall 26.

According to an exemplary embodiment of the invention which is not illustrated, the mechanical reinforcement means comprise at least one mechanical strengthening bar. The bar or bars are secured to all or part of the periphery of the cover.

A first of the bars is, for example, secured along the first long side of the cover, and a second of the bars is, in particular, secured along the second long side of the cover.

A third of the bars is, for example, secured along the first short side of the cover and/or a fourth of the bars is, in particular, secured along the second short side of the cover. In this example, the bars are disposed along the entire periphery of the cover. By contrast, provision can be made of a single bar, along the first long side of the cover provided near the inlet face for fluid to be cooled.

The bars have a quadrilateral cross section. They comprise a first face intended to be directed toward the outside of the housing, a second face in contact with the second face of the wall and lateral faces that connect their first and second faces.

According to one exemplary embodiment, the bars are soldered to the cover. The bars are then made of metal. Alternatively, the bars are held on the cover by clinching. They may also be fastened to the cover by screwing or by riveting. The bars are then made of plastic or metal.

As a variant, the bars are secured, for example, at the same time as the cover is fastened to the housing. The bar is then screwed or riveted to the cover at the same time as the cover is screwed or riveted to the housing.

Although the various exemplary embodiments of the reinforcement means have been presented separately, it is clear that the invention covers the case of combinations of the various examples, that is to say the association of two or more of these examples on the same cover.

The invention claimed is:

1. A cover for attaching to a housing of a heat exchanger, the cover comprising a wall for closing off an orifice for introducing a heat exchange core into the housing, the wall being configured to allow the cover to be attached removably to the housing and having a raised edge, the cover also comprising means for mechanical reinforcement of the wall, wherein the means for mechanical reinforcement comprises at least two identical structures, wherein each identical structure comprises at least one mechanical strengthening rib central to each structure having a long length, a short length and a thickness, wherein each mechanical strengthening rib includes at least two protrusions along the long length of each mechanical strengthening rib, wherein each protrusion is at a right angle respective to the long length and is identical in shape and orientation, wherein one of the at least two protrusions is on the right side of the long length and the other of the at least two protrusions is on the left side of the long length together forming a cross shape with the long length.

2. The cover as claimed in claim 1, wherein the mechanical reinforcement means are configured to project outwardly from the housing.

3. The cover as claimed in claim 1, wherein the rib or ribs are produced by stamping the wall.

4. The cover as claimed in claim 1, wherein all or some of the ribs extend in a mutually parallel manner along a length of the cover.

5. A heat exchange core comprising the cover as claimed in claim 1.

6. A heat exchanger comprising a core as claimed in claim 5 and a housing accommodating the core, the cover being secured to the housing.

7. An air intake module for a motor vehicle combustion engine comprising the heat exchanger as claimed in claim 6.

8. The cover as claimed in claim 3, wherein all or some of the ribs extend in a mutually parallel manner along a length of the cover.

9. The cover as claimed in claim 2, wherein the mechanical reinforcement means project from a second face of a central part of the wall.

\* \* \* \* \*